ELECTRICAL SIGNALLING SYSTEMS

Filed May 1, 1962

2 Sheets-Sheet 1

INVENTOR
JOHN CHRISTOPHER HAMMOND DAVIS
BY
DEZSOE STEINHERZ
ATTORNEY

Jan. 18, 1966 J. C. H. DAVIS 3,230,521

ELECTRICAL SIGNALLING SYSTEMS

Filed May 1, 1962 2 Sheets-Sheet 2

INVENTOR
JOHN CHRISTOPHER
HAMMOND DAVIS
BY
DEZSOE STEINHERZ
ATTORNEY

United States Patent Office 3,230,521
Patented Jan. 18, 1966

3,230,521
ELECTRICAL SIGNALLING SYSTEMS

John Christopher Hammond Davis, Taplow, England, assignor to British Telecommunications Research Limited, Taplow, England, a British company Filed May 1, 1962, Ser. No. 192,036
Claims priority, application Great Britain, May 1, 1961, 15,689/61
11 Claims. (Cl. 340—347)

Figure 1:
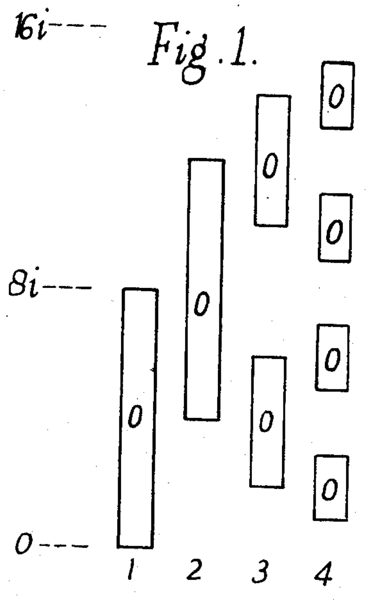

The present invention relates to electrical signalling systems and is particularly concerned with those operating on a pulse code modulation basis.

As is well known, in such a system one or more signal waveforms, for instance speech or television, are transmitted over a channel which may be used in common by a plurality of signal waveforms by associating the channel with the different inputs successively and employing a sampling rate which is at least twice as high as the highest modulation frequency it is desired to transmit; for instance in the case of speech the sampling rate might be 8,000 per second. The information derived from the sample is converted into a numerical value which may then be conveniently transmitted in binary form, though not necessarily in straight binary code.

The encoding operation presents certain difficulties, both as to the exact relationship which exists between the value of the signal and the code character to which such value is converted and also as regards the speed of operation and the amount of equipment involved. In many cases good results can be obtained from the use of a feedback type of encoder and it is possible for modifications to be included so as to give non-linear encoding according to any desired law. The feedback type of encoder however requires at least a number of operations equal to the number of elements into which the signal value is to be coded and the use of a feedback loop involves certain inherent limitations as regards speed.

Where high speed is important therefore, better results can generally be obtained from the use of parallel readout type of encoder. Hitherto however such encoders have been complicated and expensive since they generally require a separate detector for each level and this has also tended to prevent the maximum speed of operation from being achieved. The chief object of the present invention is to provide an improved form of parallel-readout encoder which largely overcomes the disadvantages mentioned above so that high speed may readily be obtained without undue cost and complexity.

According to the invention, in a parallel-readout encoder for use in a pulse code modulation signalling system using binary digits, the signal to be encoded has initially subtracted from it a current equal to half the maximum value of the signal and the resulting difference current is applied to a discriminating circuit which operates differently according to the direction of flow of the said difference current and determines the value of the binary code digit for the stage in question accordingly, the discriminating circuit serving to reverse the current for one direction of flow so that the current fed to the next stage is always in the same direction, the process being repeated for subsequent stages with the value of the current subtracted being reduced to nominally half at each succeeding stage.

By this means, an encoding arrangement may be produced which operates extremely rapidly and includes a minimum of components. A decoder for use at the receiving end may also be constructed making use of the same general principles though it is not necessary that the two should be employed in conjunction.

Figure 3:
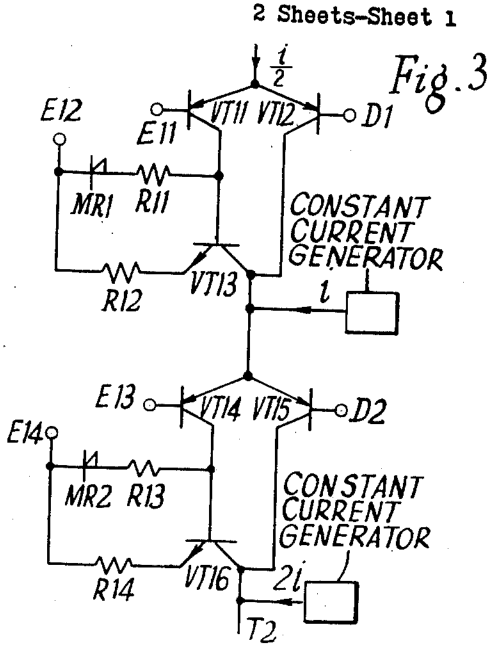
Figures 2, 4:
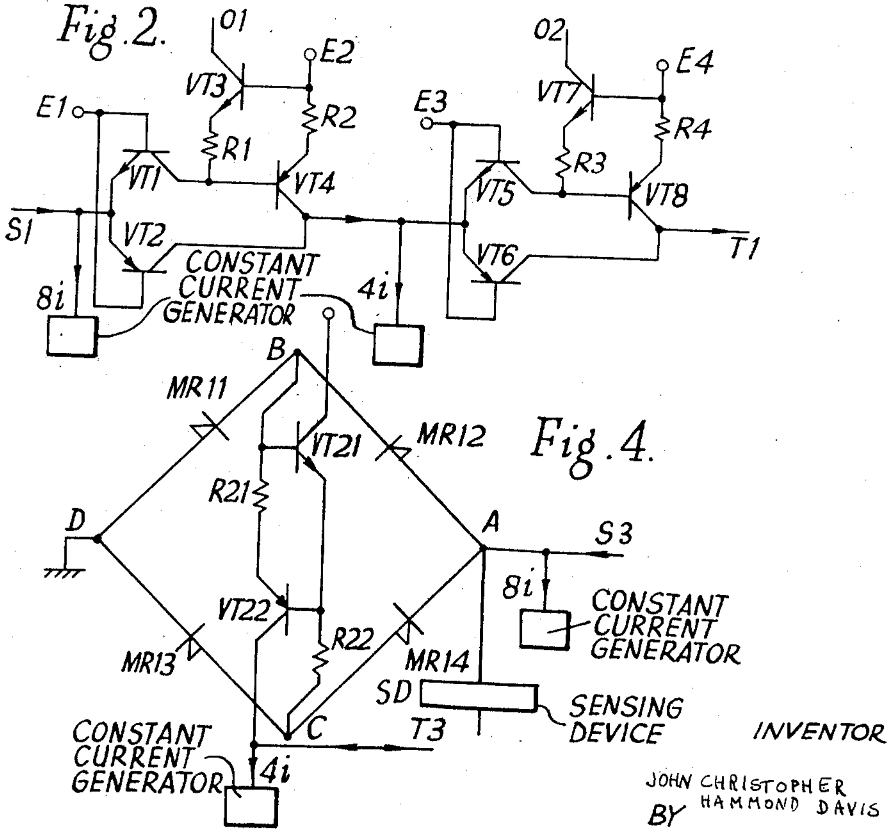
Figure 5:
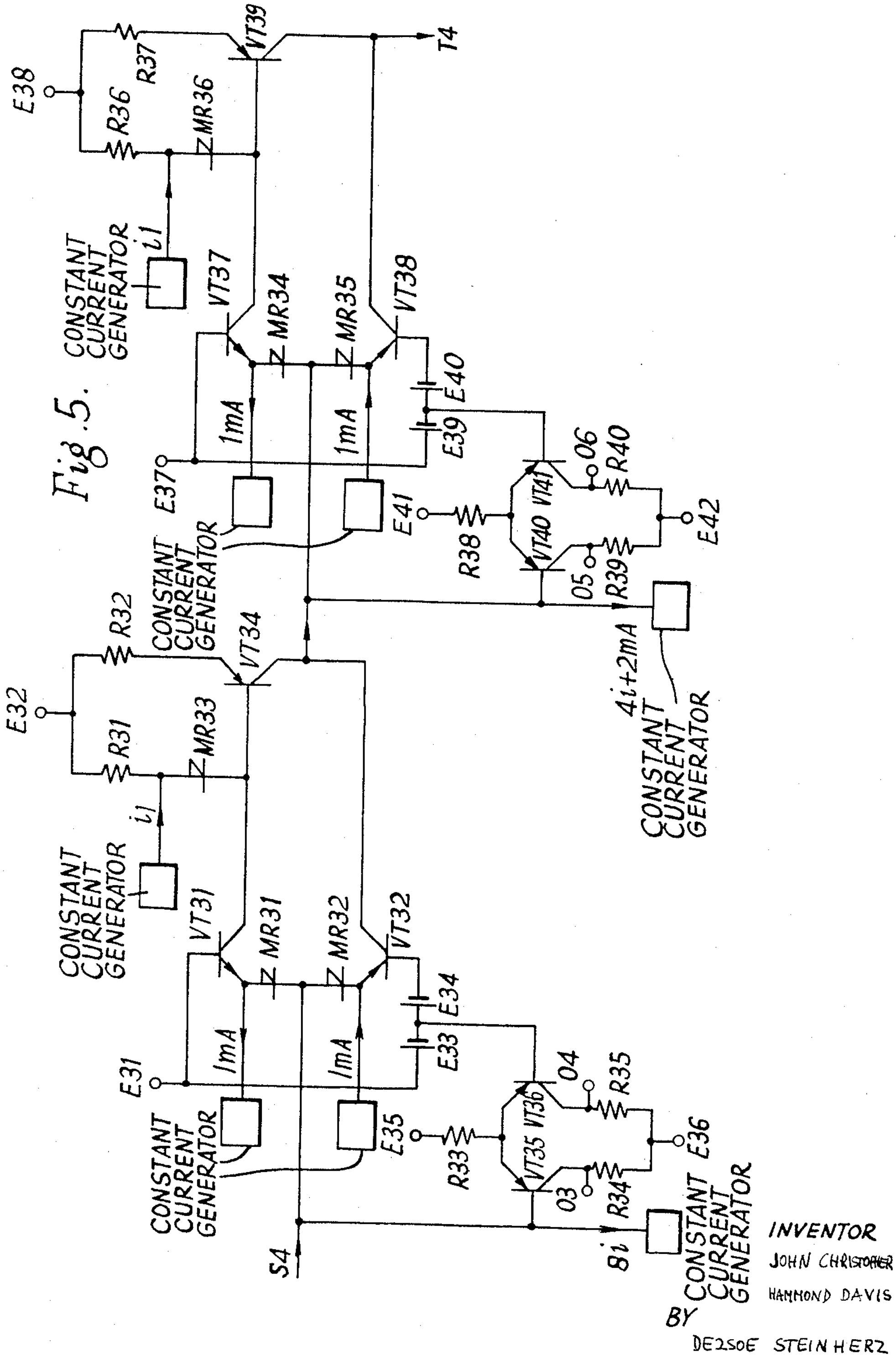

The invention will be better understood from the following description of several methods of carrying it into effect which should be taken in conjunction with the accompanying drawings comprising FIGURES 1–5. FIGURE 1 shows diagrammatically the way in which a four-digit Gray code could conveniently be employed for the purpose desired, the 0's of the code being represented by the enclosed rectangles. FIGURE 2 shows two stages of one form of the improved encoder circuit from which the nature of the remaining stages can be readily deduced. FIGURE 3 shows a suitable decoder operating on the same basis, FIGURE 4 shows a modified form of encoder based on the use of a full-wave rectifier bridge and FIGURE 5 shows a further form which gives a greater operating speed due to the use of rectifiers as well as transistors.

Referring now to FIGURE 1, this shows how any signal current level up to $16i$ can be converted into a four-digit number in Gray code. The first digit is dependent on whether the current is greater or less than $8i$ and in effect serves to decide the sign of the current which passes to subsequent stages, the remaining digits being then determined on a symmetrical basis. It will be appreciated that the Gray or cyclic permutation code has the advantage that there is a change of only one pulse in passing from one value to the next throughout the range and this avoids the production of gross errors which can occur with the binary code where at some change-points a large number or even all of the digits alter their value.

FIGURE 2 shows detailed circuits of the first two stages of a preferred form of the encoder and it will be appreciated that with the method employed, the most significant digit has to be dealt with first. The terminals E1, E2, E3 and E4 are connected to D.C. voltage sources of appropriate value. The first stage consists essentially of two transistors VT1 and VT2 of complementary type having their emitters connected together and their bases both connected to the source E1. The signal incoming over lead S1 is applied to the emitters after having a current of $8i$ subtracted from it. If the signal current is greater than $8i$ so that the resultant current flows into the emitter of VT2, substantially the same current flows from the collector to the next stage. If the signal current is less than $8i$ so that a flow takes place from the emitter of VT1, the corresponding collector current sets up a potential across R1 such that a substantially equal current flows through R2 and the emitter-collector circuit of transistor VT4. This result is achieved if R1 is substantially equal to R2. The result is that the output to the next stage is the same for values of signal current which are greater or less than $8i$ by the same amount. The difference is that in one case transistor VT3 conducts whereas in the other case it does not and the collector current over lead O1, suitably amplified, may therefore be used in determine whether the first digit is a 0 or a 1. In order to agree with the showing of FIGURE 1, a 0 will be indicated when VT3 conducts.

The next stage comprising transistors VT5–VT8 and resistors R3 and R4 is substantially similar but in this case the current initially subtracted is $4i$. This has the effect of causing discrimination about signal current values of $4i$ and $12i$ and the process is repeated in two further stages fed over lead T1, at the beginning of which stages the currents subtracted are $2i$ and $i$ respectively.

The transistor VT3, in addition to determining what the value of the digit shall be in accordance with its conducting or non-conducting condition, also balances the voltage drop between the emitter and base of VT4 and this serves to minimise distortion. This effect may be produced alternatively by the use of a rectifier as will be explained in connection with the description of FIGURE 5.

It is also possible to arrange the circuit with n-p-n transistors substituted for p-n-p and vice versa. If this reversal is effected at alternate stages, the voltages required alternate up and down and this eases the problem of providing power supplies.

FIGURE 3 shows two stages of a decoder suitable for use with the encoder of FIGURE 2 and making use of the same general principles. A current of $\frac{1}{2}i$ is applied to the emitters of the transistors VT11 and VT12, of which VT11 has its base connected to a suitable fixed potential E11, while the potential of the base of VT12 connected to terminal D1 varies according to the digit received which in this case is the least significant digit. If this is a 1, the base of VT12 is more negative than that of VT11 and consequently VT12 conducts so that current $\frac{1}{2}i$ is supplied to the next stage. If the digit is a 0, the base of VT12 is more positive than that of VT11 and consequently VT11 conducts and the current concerned which is $\frac{1}{2}i$ is reversed in sign by the circuit composed of resistors R11 and R12, transistor VT13 and rectifier MR1. This circuit it will be appreciated is similar to that used in the encoder, rectifier MR1 operating satisfactorily in this case to balance the base-emitter drop of VT13. Accordingly the output of the first stage is $\pm\frac{1}{2}i$ dependent on the potential applied to D1 and a current $i$ is now injected so that at the input to the next stage the current is either $1\frac{1}{2}i$ or $\frac{1}{2}i$.

The next stage comprising transistors VT14–VT16, resistors R13 and R14 and rectifier MR2 is similar and at the output a current of $2i$ is injected. The resultant is fed over lead T2 to two further stages having injected currents of $4i$ and $8i$ respectively. Thus at the output of the fourth stage of the decoder it is possible to produce any one of a series of currents differing by steps of $i$ and having values from $\frac{1}{2}i$ to $15\frac{1}{2}i$. These currents correspond to the means between successive pairs of levels produced in the encoder and thus provide the best possible reproduction of the original signal within the limitation set by quantisation. In the decoder also, the types of transistors may all be reversed and as before certain advantages are gained if this reversal takes place between stages.

FIGURE 4 shows a modified arrangement for the encoder which may provide advantages in certain circumstances. The stage shown is that corresponding to the most significant digit and it will be seen that rectifiers MR11 to MR14 are connected to form a full-wave rectifier bridge having one corner D earthed while the signal is applied over lead S3 to the opposite corner A after a current of $8i$ has been subtracted therefrom. A difference current then flows through resistor R21 and transistor VT22 to the following stage. If the signal current is greater than $8i$, this difference current flows through rectifier MR12. If the signal current is less than $8i$, the difference current flows through rectifier MR11. An equal current flows through transistor VT21 and resistor R22 so that the combination of VT21, VT22, R21 and R22 appears to the rectifier bridge as a resistive load equal to R21 between points B and C. The current between the points B and C, which are not at earth potential, can thus be transmitted to any other convenient voltage which the following circuit may require so that analogous stages may be connected in tandem. The sign of the difference current which determines the value of the corresponding digit is dependent on the potential at A which changes from positive to negative as the signal current passes through $8i$. Readout at this point is effected by a sensing device SD for instance employing a circuit such as is described in connection with FIGURE 5.

Subsequent stages fed over lead T3 are similar except that, as in the case of the FIGURE 2 arrangement, at the second stage the current extracted is $4i$ and at the third stage is $2i$ and so on.

This circuit has the advantage that it is symmetrical for both signs of the difference current. Compensation for non-unity current gain is therefore easier, it being necessary only to make suitable adjustment of the constant current extracted before the following stage.

Referring now to FIGURE 5, this shows an arrangement generally similar to that of FIGURE 2 but incorporating certain modifications which may be desirable in some circumstances. With the circuit of FIGURE 2, the change in the value of the signal current means that in some cases transistor VT1 will be conducting and in other cases transistor VT2. The transition from one to the other limits the speed at which the circuit will operate and it is found that the changeover speed in comparable conditions is higher for rectifiers than for transistors. Moreover additional speed may be attained if provision is made for a small current to flow continuously. Both these points are taken care of in the arrangement according to FIGURE 5. In addition the reversing circuit involving the transistors VT3 and VT4 has been modified in that the transistor VT3 is now replaced by a rectifier in a circuit generally similar to the reversing circuit shown in FIGURE 3 for the decoder. In these circumstances, a modified circuit is preferably employed for obtaining readout of the digit selected by that stage, this circuit involving transistors VT35 and VT36.

In considering the operation of the circuit shown in FIGURE 5, assume first that the signal applied over S4 is equal to $8i$ so that no current flows in either MR31 or MR32. It is arranged however that constant currents of for example 1 ma. are extracted or injected as shown at the emitters of VT31 and VT32. These transistors and also transistor VT34 are therefore always conducting at least 1 ma. and this renders them capable of operation at very high speeds.

If the signal current is greater than $8i$, the difference current passes through MR32 and is added to the current already flowing through transistor VT32. If the signal current is less than $8i$, the difference current passes through MR31 and is added to the current already flowing in transistor VT31. The operation is otherwise similar to that of FIGURE 2 except that an additional direct current of 2 ma. total always flows from the collectors of VT32 and VT34 and must therefore be extracted as shown before the succeeding stage.

For any given value of signal current, either MR31 or MR32 is back-biased while the other is conducting. As already mentioned, it is the delay caused when the changing signal tries to reverse the situation which is the main speed limitation. The limitation previously due to VT1 and VT2 in FIGURE 2 has therefore been transferred to MR31 and MR32 in FIGURE 5 but this is a change for the better since very fast diodes with very low stray capacitances are now available. A further increase in speed can be obtained by introducing additional potentials E33 and E34 which are indicated by battery symbols. If $\delta i$ represents the difference between a signal and $8i$, C the total stray capacitance at the junction of MR31 and MR32, and $\delta v$ the potential by which this point has to change between MR31 conducting and MR32 conducting, the time taken for the changeover is $C\delta v/\delta i$. The effect of increasing the values of E33 and E34 is to decrease $\delta v$ and thus the time taken for the changeover. The limit to what can be done in this direction is set by the fact that MR31 and MR32 must never both be biased in the conducting direction.

The two transistors VT35 and VT36 in association with a resistor R33 form a current switch whose outputs across R34 and R35 can be taken from terminals O3 and O4 to constitute one method of extracting digital information from the encoder. For this purpose, the potential at the junction of MR31 and MR32 is compared with the mean between its two extreme possible values. This can be made available from the junction between E33 and E34, these potentials being made equal if VT31 and VT32 are similar and also MR31 and MR32 are similar.

When this arrangement is employed for the reading out operation, VT3 in the reversing circuit of FIGURE 2 can be replaced by MR33 in FIGURE 5 to compensate for the base-emitter drop in VT34. If MR33 is contained within the same encapsulation as VT34, temperature effects will largely cancel out. However even though the drop across MR33 and the drop across the base-emitter junction of VT34 may vary in the same way with changes in current, there is likely to be a basic difference between the two. By injecting or extracting a current $i1$ between R31 and MR33 as shown, a compensating potential can be generated across R31. As before it is assumed that D.C. voltage sources of appropriate value are connected to terminals E31, E32, E35 and E36.

FIGURE 5 shows a second stage which is similar in all respects to the first stage except that the current initially extracted is $4i$ instead of $8i$. In addition as already pointed out, the current assumed to be 2 ma. provided in the first stage must be subtracted before the second stage. Two further stages fed over lead T4 serve to provide the remaining two digits which are assumed to be necessary to make up the complete number.

With all the arrangements as so far described, the encoder will have a linear characteristic which may not always be desirable. It can however be given a range of desired non-linear characteristics by varying the extracted currents $i$, $2i$ and so on in accordance with the signal, the binary basis being maintained. Where the law is to be symmetrical about the mean value of the signal, that is to say $8i$ in the example given, then the extracted current equal to this mean value should not be varied.

The invention accordingly provides an improved parallel-readout type encoder which is capable of high speeds of operation and employs only a comparatively small number of simple components.

I claim:

1. In a pulse code modulation system, an encoder for converting a signal sample into a numerical code involving a plurality of binary digits, comprising a plurality of similar stages connected in tandem corresponding in number to said plurality of digits, a pair of transistors of complementary type, means for subtracting from said signal at the first stage a current equal to half the maximum value of said signal, connecting means for causing the resulting difference current to flow through one or other of said transistors dependent on the direction of flow of said current, means included in the circuit of one of said transistors for providing a current equal to that flowing through said one transistor but in the reverse direction, means for feeding said reverse current and the output from the other of said transistor circuits to the next of said stages, means dependent on the effective operation of said current reversing means for determining the value of the binary digit corresponding to said first stage, means for subtracting at said next stage a current equal to half that subtracted at said first stage, and further transistors and current reversing means forming a similar circuit configuration for said next stage and all the remaining stages respectively the value of the current subtracted at each stage being nominally half that subtracted at the preceding stage.

2. An encoder as claimed in claim 1 including means for subtracting a small fixed current from the circuit of said one of said pair of transistors, means for injecting a current equal to said fixed current into the circuit of said other of said pair of transistors and means for subtracting a current equal to twice said fixed current from the input to the next stage.

3. An encoder as claimed in claim 1 employing a read out circuit for determining the appropriate value of the binary digit comprising a first transistor, a second transistor, a resistor connected between a fixed voltage source and the emitters of said first and second transistors, the base of said first transistor being connected to a fixed potential and the base of said second transistor to a lead carrying the signal sample and the value of the binary digit being obtained selectively from the collectors of said first and second transistors.

4. In a pulse code modulation system, and encoder for converting a signal sample into a numerical code involving a plurality of binary digits, comprising means for subtracting from said signal at the first stage a current equal to half the maximum value of such signal, means for causing the difference current to follow one or other of two parallel paths depending on its direction of flow, means in one of said paths for reversing the direction of flow of said current so that the current flow after said parallel paths reunite is always in the same direction, said reversing means comprising a rectifier and a first resistor connected in series between a fixed voltage source and the entry to said one of said parallel paths, a transistor having its base connected to the entry to said one of said parallel paths, a second resistor of substantially the same value as said first resistor connected between said fixed voltage source and the emitter of said transistor, and a connection from the collector of said transistor to the point where said parallel paths reunite, means dependent on the path followed by said difference current for determining the value of the binary digit corresponding to that stage, the current from the point where the parallel paths reunite extending to a similar stage at which a current is subtracted equal to half that subtracted at the previous stage, the circuit configuration being repeated for the second and all subsequent stages up to a total number equal to said plurality of digits, the value of the current subtracted at each stage being nominally half that subtracted at the preceding stage.

5. An encoder as claimed in claim 4 in which means are provided for injecting a fixed current at the junction of said rectifier and said first resistor to compensate for lack of balance between said rectifier and the base-emitter junction of said transistor.

6. In a pulse code modulation system, an encoder for converting a signal sample into a numerical code involving a plurality of binary digits, comprising a plurality of similar stages connected in tandem corresponding in number to said plurality of digits, a pair of rectifiers, a pair of transistors of complementary type, means for subtracting from said signal at the first stage a current equal to half the maximum value of said signal, connecting means for causing the resulting difference current to flow through one or other of said rectifiers and the corresponding one of said transistors dependent on the direction of flow of said current, means included in the circuit of one of said transistors for providing a current equal to that flowing through said one transistor but in the reverse direction, means for feeding said reverse current and the output from the other of said transistor circuits to the next of said stages, means dependent on the path followed by said difference current for determining the value of the binary digit corresponding to said first stage, means for subtracting at said next stage a current equal to half that subtracted at said first stage, and further rectifiers and transistors forming a similar circuit configuration for said next stage and all the remaining stages respectively, the value of the current subtracted at each stage being nominally half that subtracted at the preceding stage.

7. In a pulse code modulation system, an encoder for converting a signal sample into a numerical code involving a plurality of binary digits, comprising a plurality of similar stages connected in tandem corresponding in number to said plurality of digits, a rectifier bridge, means for subtracting from said signal at the first stage a current equal to half the maximum value of said signal, means for applying the resulting difference current to one corner of said bridge and for connecting the opposite corner to earth, a first transistor of one type connected between a fixed voltage source and one of the remaining corners of said bridge, a second transistor of opposite type connected between the other remaining corner of said bridge and the output to the next stage, connections from each transistor circuit to the base of the transistor in the other transistor circuit, means dependent on the polarity of said one corner of said bridge for determining the value of the binary digit corresponding to said first stage, means for subtracting at said next stage a current equal to half that subtracted at said first stage, and further rectifiers and transistors forming a similar circuit configuration for said next stage and all the remaining stages respectively, the value of the current subtracted at each stage being nominally half that subtracted at the preceding stage.

8. In a pulse code modulation system, an encoder for coverting a signal sample into a numerical code involving a plurality of binary digits, comprising means for subtracting from said signal at the first stage a current equal to half the maximum value of such signal, means for causing the difference current to follow one or other of two parallel paths depending on its direction of flow, means in one of said paths for reversing the direction of flow of said current so that the current flow after said parallel paths reunite is always in the same direction, said reversing means comprising a pair of transistors of complementary types, a first resistor and a second resistor of substantially equal value connected respectively in the emitter circuits of said transistors, a first fixed voltage source to which the emitter of one of said transistors is connected by way of said first resistor, a connection from said one parallel path to the base of said one transistor, a connection from the collector of said one transistor to the point where said parallel paths reunite, a connection from said first fixed voltage source to the base of the other of said transistors, a connection from the emitter of said other transistor to said one parallel path by way of said second transistor, and a second fixed voltage source connected to the collector of said other transistor whereby the flow of current through said second resistor and said other transistor biases the base of said one transistor to cause said one transistor to conduct and permit a current to flow to the next stage which is substantially equal to the current flowing in said one parallel path, means dependent on the path followed by said difference current for determining the value of the binary digit corresponding to that stage, the current from the point where the parallel paths reunite extending to a similar stage at which a current is subtracted equal to half that subtracted at the previous stage, the circuit configuration being repeated for the second and all subsequent stages up to a total number equal to said plurality of digits, the value of the current subtracted at each stage being nominally half that subtracted at the preceding stage.

9. In a pulse code modulation system, a decoder for converting a signal in the form of a plurality of binary code digits into a corresponding analogue signal comprising means for supplying a current of predetermined value to two alternative paths, means dependent on the value of the associated digit for determining which of said two alternative paths shall be traversed by said current, means in one of said paths for reversing the direction of current flow without altering its value so that the value of the output current after said alternative paths reunite has one or other of two different values dependent on which of said alternative paths is effective, means for supplying to said output a current equal to approximately twice the predetermined current supplied initially, means for applying the resultant current to a similar second stage, the circuit configuration being repeated for the second and all the remaining stages corresponding to the full plurality of digits, the current fed in at any stage being nominally twice the value of that fed in at the preceding stage.

10. A decoder as claimed in claim 9 in which said current reversing means comprises a rectifier and a first resistor connected in series between a fixed voltage source and the entry to said one of said alternative paths, a transistor having its base connected to the entry to said one of said alternative paths, a second resistor of substantially the same value as said first resistor connected between said fixed voltage source and the emitter of said transistor, and a connection from the collector of said transistor to the point where said alternative paths reunited.

11. In a pulse code modulation system, a decoder for converting a signal in the form of a plurality of binary code digits into a corresponding analogue signal, comprising a plurality of stages equal to said plurality of digits, a first pair of transistors of similar type connected in two parallel paths, means for supplying a current of predetermined value to said transistors, means dependent on the value of the least significant of said binary digits for determining which of said paths shall be traversed by said current, reversing means in one of said paths for supplying a current equal in value but opposite in polarity to the current fed in whereby the value of the output current after said paths reunite has one or other of two different values dependent on which of said two paths is effective, means for supplying to said output a current equal to approximately twice said predetermined current initially supplied, means for applying the resultant current to a second stage employing a second pair of transistors and reversing means in a circuit configuration similar to that provided for said first stage, the circuit configuration being repeated for subsequent stages, the current fed in at any stage being norminally twice the value of that fed in at the preceding stage.

References Cited by the Examiner

UNITED STATES PATENTS

| | | | |
|---|---|---|---|
| 2,733,432 | 1/1956 | Breckman | 340—347 |
| 2,970,309 | 1/1961 | Towles | 340—347 |
| 3,019,426 | 1/1962 | Gilbert | 340—347 |
| 3,041,469 | 6/1962 | Ross | 340—347 |
| 3,092,824 | 6/1963 | Bentley | 340—347 |

MALCOLM A. MORRISON, *Primary Examiner.*

D. M. ROSEN, W. J. KOPACZ, *Assistant Examiners.*